US011157763B2

(12) United States Patent
Iyer

(10) Patent No.: US 11,157,763 B2
(45) Date of Patent: Oct. 26, 2021

(54) SYSTEM AND METHOD FOR IDENTIFYING TARGET SECTIONS WITHIN IMAGES

(71) Applicant: Wipro Limited, Bangalore (IN)

(72) Inventor: Manjunath Ramachandra Iyer, Bangalore (IN)

(73) Assignee: Wipro Limited, Bangalore (IN)

( * ) Notice: Subject to any disclaimer, the term of this patent is extended or adjusted under 35 U.S.C. 154(b) by 53 days.

(21) Appl. No.: 16/826,333

(22) Filed: Mar. 23, 2020

(65) Prior Publication Data

US 2021/0248409 A1 Aug. 12, 2021

(30) Foreign Application Priority Data

Feb. 7, 2020 (IN) .............................. 202041005400

(51) Int. Cl.
| | |
|---|---|
| *G06K 9/00* | (2006.01) |
| *G06K 9/46* | (2006.01) |
| *G06T 7/60* | (2017.01) |
| *G06N 3/08* | (2006.01) |

(52) U.S. Cl.
CPC ............. *G06K 9/46* (2013.01); *G06K 9/0057* (2013.01); *G06N 3/08* (2013.01); *G06T 7/60* (2013.01); *G06T 2207/20084* (2013.01); *G06T 2207/20101* (2013.01)

(58) Field of Classification Search
CPC .......... G06K 9/46; G06K 9/0057; G06N 3/08; G06T 7/60; G06T 2207/20084; G06T 2207/20101
See application file for complete search history.

(56) References Cited

U.S. PATENT DOCUMENTS

| | | | | |
|---|---|---|---|---|
| 10,922,480 | B2* | 2/2021 | Jiang | ....................... G06F 16/29 |
| 2018/0075581 | A1 | 3/2018 | Shi et al. | |
| 2019/0197359 | A1* | 6/2019 | Haneda | .................... G06N 3/08 |
| 2019/0220694 | A1* | 7/2019 | Biswas | ................ G06K 9/6202 |
| 2020/0065560 | A1* | 2/2020 | Kaneko | .............. G06K 9/00268 |

FOREIGN PATENT DOCUMENTS

CN 106327428 A 1/2017

* cited by examiner

*Primary Examiner* — Xin Jia
(74) *Attorney, Agent, or Firm* — Finnegan, Henderson, Farabow, Garrett & Dunner, LLP

(57) ABSTRACT

A system and method for identifying and subsequently modifying target sections within images is disclosed. The method includes receiving a user request that includes a target image and a user input, such that the user input includes an action corresponding to the target image. The method further includes extracting a plurality of target image attributes from the user input and comparing the plurality of target image attributes with a set of attributes within a pattern attribute table. The pattern attribute table includes mapping of each of the set of attributes to an associated set of activated neurons within a neural network. Comparing the plurality of target image further includes identifying a set of activated neurons mapped to the matching attribute as neuron activations corresponding to the plurality of target image attributes. The method includes identifying a target image section based on the set of activated neurons using a back-propagation technique.

19 Claims, 8 Drawing Sheets

SYSTEM AND METHOD FOR IDENTIFYING TARGET SECTIONS WITHIN IMAGES

TECHNICAL FIELD

The present invention relates to machine learning systems for processing images. In particular, the present invention relates to a system and method for identifying and subsequently modifying target sections within images.

BACKGROUND

Various applications in fields of medical systems, security systems, fault detection systems, and insurance need images of high resolutions due to requirement of high preciseness and effectiveness in respective operations. Conventionally, such applications use Generative Adversarial Networks (GAN) for synthesizing high resolution images from low resolution images. The GAN are based on machine learning and have a variety of applications, for example, image editing, data generation, three-dimensional (3-D) object generation, and attention prediction etc.

Conventional GAN perform adaptive interpolation on images iteratively, in order to find a point of high resolution. At times, a user may be interested in certain sections of an image, and not in the whole image. In such cases, the GAN may not produce effective results, as the GAN enhance resolution of the whole image, even when resolution of a small section of the image is required to be enhanced. As a result, the GAN have some limitations, which may include large training data requirement and wastage of time and resources. For example, during a tele-surgery, the surgeon may only be interested in the area around the forceps. In that case, an image section of scissor and forceps is required to be enhanced in order to check which organ is being cut. Therefore, in the above scenario, the GAN may enhance the whole image, even when, only a certain section associated with the forceps is required to be enhanced. This may result in wastage of resources as well as time.

In a similar manner, one of the conventional methods provide super resolution images. However, this conventional method require a large part of memory to store data, as they enhance resolution of full image instead of focusing on a particular section of the image. In another one of the conventional methods, images are down sampled to obtain more training data. Then, the down sampled images may be transferred to the corresponding high-resolution images without considering relative relevance features. This results in wastage of resources. Thus, this conventional method does not focus on high resolution of highly relevant features of images. Similarly, other conventional methods reflect some drawbacks, such as, patchy and pixelated images, computationally expensive techniques (as undesired portions may also be covered), and quality limitation. Additionally, none of the conventional methods provide any methodology to enhance the resolution of arbitrary shaped portions without considering neighboring pixels, for example, tires of a car or blue sky in a scenery.

SUMMARY

In one embodiment, a method for identifying target image sections within images is disclosed. In one embodiment, the method may include receiving a user request comprising a target image and a user input, it should be noted that the user input may comprise an action corresponding to the target image. The method may further include extracting a plurality of target image attributes from the user input and comparing the plurality of target image attributes with a set of attributes within a pattern attribute table to identify a matching attribute. It should be noted that the pattern attribute table may comprise mapping of each of the set of attributes to an associated set of activated neurons within a neural network. Further, comparing the plurality of target image attributes may comprise identifying a set of activated neurons mapped to the matching attribute as neuron activations corresponding to the plurality of target image attributes. The method may further include identifying a target image section within the target image processed through the neural network, based on the set of activated neurons identified as the neuron activations, using a back-propagation technique.

In another embodiment, a system for identifying target image sections within images is disclosed. The system includes a processor and a memory communicatively coupled to the processor, wherein the memory stores processor instructions, which, on execution, causes the processor to receive a user request comprising a target image and a user input, such that the user input comprises an action corresponding to the target image. The processor instructions further cause the processor to extract a plurality of target image attributes from the user input and compare the plurality of target image attributes with a set of attributes within a pattern attribute table to identify a matching attribute. It should be noted, the pattern attribute table may comprise mapping of each of the set of attributes to an associated set of activated neurons within a neural network. The processor instructions further cause the processor to identify a set of activated neurons mapped to the matching attribute as neuron activations corresponding to the plurality of target image attributes. The processor instructions further cause the processor to identify the target image section within the target image processed through the neural network, based on the set of activated neurons identified as the neuron activations, using a back-propagation technique.

In yet another embodiment, a non-transitory computer-readable medium storing computer-executable instruction for identifying target image sections within images is disclosed. In one example, the stored instructions, when executed by a processor, may cause the processor to perform operations including receiving a user request comprising a target image and a user input, it should be noted that the user input may comprise an action corresponding to the target image. The operations may further include extracting a plurality of target image attributes from the user input and comparing the plurality of target image attributes with a set of attributes within a pattern attribute table to identify a matching attribute. It should be noted that the pattern attribute table comprises mapping of each of the set of attributes to an associated set of activated neurons within a neural network. The operations may further include identifying a set of activated neurons mapped to the matching attribute as neuron activations corresponding to the plurality of target image attributes. The operations may further include identifying a set of activated neurons mapped to the matching attribute as neuron activations corresponding to the plurality of target image attributes.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
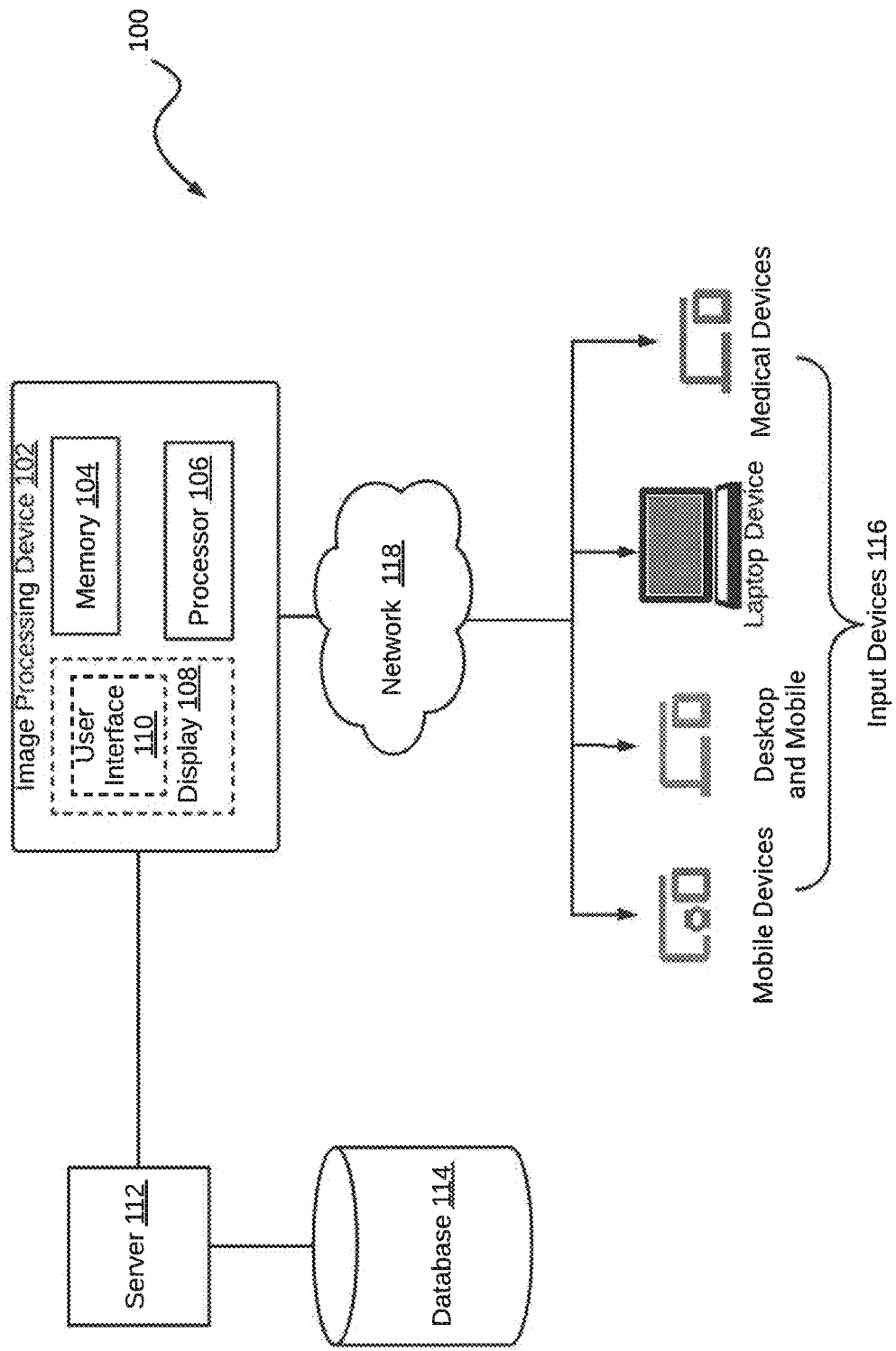
FIG. 1 is a block diagram of a system for identifying and modifying a target image section within a target image, in accordance with an embodiment.

In one embodiment, a system 100 for identifying and modifying a target image section within a target image is illustrated in the FIG. 1. In an embodiment, an image processing device 102 may be used to identify the target image section first, thereafter, the image processing device 102 may modify and generate an output image corresponding to the target image. The image processing device 102 may modify the target image section selectively according to requirements of a user without compromising the quality of the target image. In other words, the image processing device 102 may identify a target image section in the target image and may then modify or edit the target image section based on a user command. This results in eliminating problems of conventional methods and system, which may include, but are not limited to generating patchy and pixilated images and more time and resources consumption. Examples of the image processing device 102 may include, but are not limited to, a server, a desktop, medical devices, a laptop, a notebook, a tablet, a smartphone, a mobile phone, an application server, or the like.

The image processing device 102 may include a memory 104, a processor 106, and a display 108. The memory 104 and the processor 106 of the image processing device 102 may perform various functions including training a Machine Learning (ML) model, identification of the target image section, and modification of the target image section. The memory 104 may store instructions that, when executed by the processor 106, cause the processor 106 to identify and modify the target image section in a particular way. The memory 104 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include but are not limited to Dynamic Random Access Memory (DRAM), and Static Random-Access memory (SRAM).

The display 108 may further include a user interface 110. A user or an administrator may interact with the image processing device 102 and vice versa through the display 108. By way of an example, the display 108 may be used to display results of analysis performed by the image processing device 102, to the user. By way of another example, the user interface 110 may be used by the user to provide inputs to the image processing device 102.

As will be described in greater detail in conjunction with FIG. 2 to FIG. 9, in order to identify and subsequently modify the target image section, the image processing device 102 may extract a user request 204 (not shown in FIG. 1) including the target image and a user input from a server 112, which is further operatively coupled to a database 114.

The image processing device 102 may also receive the user request 204 from one or more of a plurality of input devices 116. Examples of the plurality of input devices 116 may include, but are not limited to, a desktop, a laptop, medical devices, a notebook, a netbook, a tablet, a smartphone, a remote server, a mobile phone, or another computing system/device. Further, examples of medical devices may include, but are not limited to an X-ray machine, a Computerized Tomographic (CT) scanning machine, a Magnetic Resonance Imaging (MRI) machine, an ultrasonography machine, or a positron emission tomographic machine. The plurality of input devices 116 may be communicatively coupled to the image processing device 102, via a network 118. The network 118 may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS).

Once the target image is received, the image processing device 102 may identify and modify the target image section within the target image, based on the user input. Thereafter, the image processing device 102 may share the output image (that includes the modified target image section) with one or more of the plurality of input devices 116.

Figure 2:
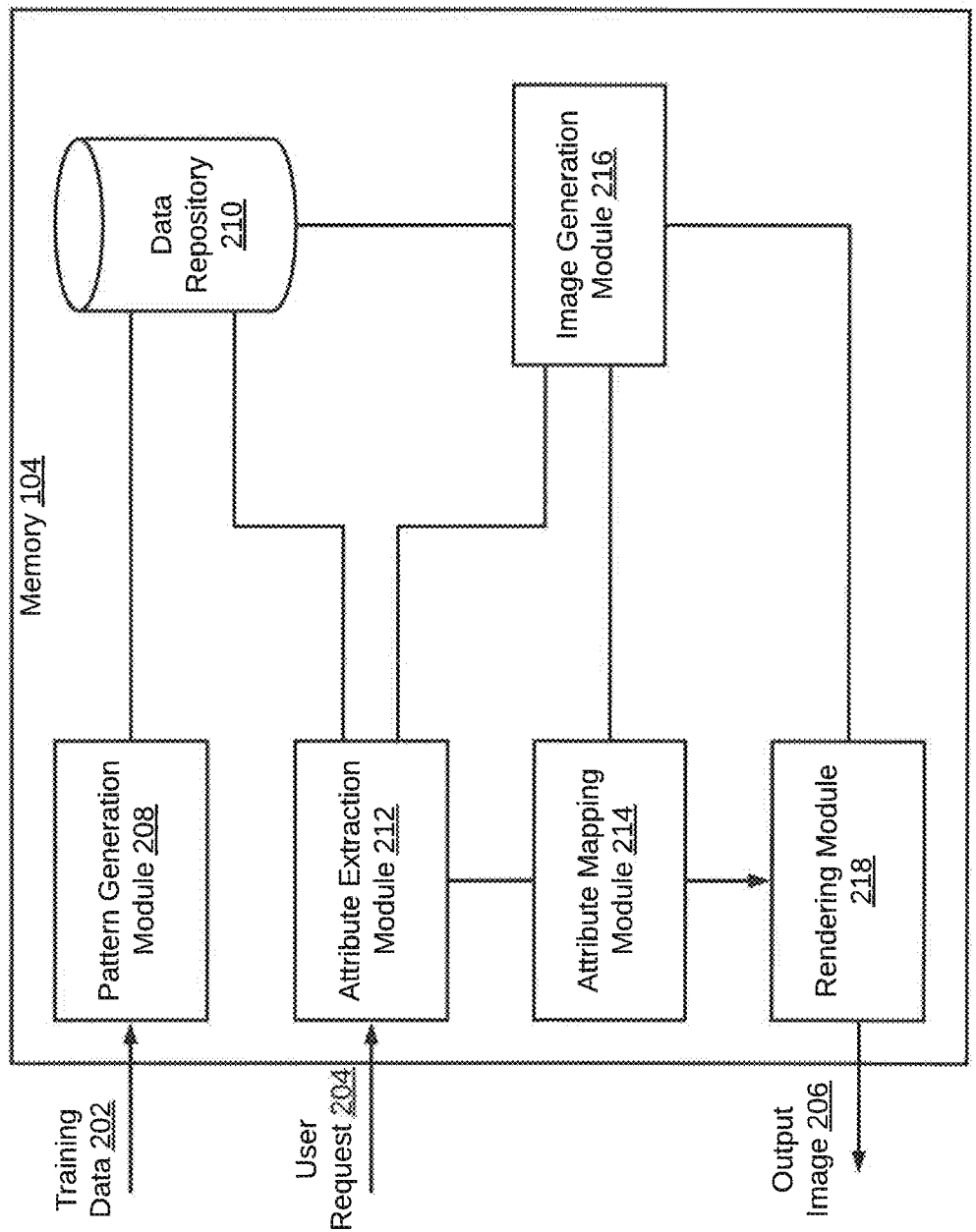
FIG. 2 is a block diagram of various modules within a memory of an image processing device configured to identify and modify a target image section within a target image, in accordance with an embodiment.

Referring now to FIG. 2, a block diagram of various modules within the memory 104 of the image processing device 102 configured to identify and modify a target image section within a target image is illustrated, in accordance with an embodiment. The memory 104 may include various modules, that operate to identify and modify the target image section within the target image. The image processing device 102 may receive a training data 202 and the user request 204, based on which the image processing device 102 may generate an output image 206. The training data 202 and the user request 204 may be received by one or more modules in the memory 104, which may include a pattern generation module 208, a data repository 210, an attribute extraction module 212, an attribute mapping module 214, an image generation module 216, and a rendering module 218.

The training data 202 may include a plurality of training images that may be used for training a neural network, for example, a Convolution Neural Network (CNN). The plurality of training images may be associated with one of, but is not limited to a medical field, security systems, fault detection systems, or insurance. The training data 202 is fed into the pattern generation module 208 in order to train the neural network. By way of an example, target images from which target image sections need to be identified may be that of Printed Circuit Boards (PCBs). A user requirement may be to identify as well as modify target image sections of cuts associated with PCB images. In such case, the training data 202 may include images that have all possible variations of cuts on PCBs. These variations, for example, may include a horizontal cut, a vertical cut, or multiple cuts on a PCB.

The pattern generation module 208 may be communicatively coupled to the data repository 210. The pattern generation module 208 may generate a pattern attribute table upon receiving the training data 202 based on the neural network. The pattern generation module 208 may extract a plurality of attributes associated with the training images and may identify patterns corresponding to the training data 202 to generate the pattern attribute table. The pattern attribute table may include a mapping of attributes corresponding to the training data 202 to address of neurons in the neural network. The pattern generation module 208 may then store the pattern attribute table in the data repository 210. In addition to storing the pattern generation table, the data repository 210 may also store all intermediate results obtained during generation of the pattern attribute table. The data repository 210 may further be communicatively coupled to the attribute extraction module 212 and the image generation module 216.

The attribute extraction module 212 may receive the user request 204. The user request 204 may include at least a target image and a user input. The target image may be an image from which a target image section is to be identified by the image processing device 102. It will be apparent to a person skilled in the art that multiple target image sections may be identified from the target image. Further, the user input may specify an action to be performed on the target image section. For the above-mentioned example of the PCB, the user request 204 may include the user input as "show me all vertical cuts on the PCB in high resolution" and a PCB image as the target image. The user input may be one of a text or an audio input (e.g., a voice note) provided by the user.

After receiving the user request 204, the attribute extraction module 212 may fetch the pattern attribute table from the data repository 210. The attribute extraction module 212 may extract target image attributes from the user input in the user request 204. In an embodiment, when the user input is an audio input, the attribute extraction module 212 may use a Natural Language Processing (NLP) technique to first convert the audio input into text associated with the audio input. Thereafter, the attribute extraction module 212 may extract the target image attributes from the converted text. The attribute extraction module 212 may use a neural network (similar to the neural network used by the pattern generation module 208) for generating neural network features (for example, CNN features) associated with the user request 204. Thereafter, the attribute extraction module 212 shares the extracted target image attributes and the neural network features with the attribute mapping module 212. The attribute extraction module 212 may additionally be communicatively coupled to the image generation module 216 as shown in FIG. 2.

After receiving the neural network features along with the target image attributes, the attribute mapping module 214 compares the target image attributes with attributes within the pattern attribute table in order to identify a matching attribute from the pattern attribute table. Further, as each attribute in the pattern matching table is mapped to corresponding activated neurons, the attribute mapping module 214 may identify activated neurons mapped on to the matching attribute in the pattern matching table. Thereafter, based on the activated neurons thus identified, the attribute mapping module 214 may identify the target image section within the target image using a back-propagation technique applied in the neural network.

The attribute mapping module 214 may then share the target image with the identified target image section with the image generation module 216 for subsequent processing. The attribute mapping module 214 may also be communicatively coupled to the rendering module 218. The input peripheral of the image generation module 216 may be operatively coupled to the attribute mapping module 214 and the output peripheral may be operatively coupled to the rendering module 218. The image generation module 216 may further be communicatively coupled to the data repository 210 to fetch required data.

After receiving the target image with the identified target image section, the image generation module 216 may fetch image patterns corresponding to the matching attribute from the data repository 210 and may then modify the target image section based on the target image attributes. In an embodiment, the image generation module 216 may use a Generative Adversarial Networks (GAN) to modify one or more of a plurality of features associated with the target image section. The plurality of features may include one or more of a resolution of the target image section, a size of the target image section, a color of the target image section, a dimension of the target image section, a contrast of the target image section, noise associated with the target image section, uniformity associated with the target image section, or sharpness associated with the target image section. Thus, the modification in target image section, for example, may include at least one of a resolution modification of a target image section, a size modification of the target image section, a color modification of the target image section, a dimension modification of the target image section, a contrast modification of the target image section, noise modification associated with the target image section, uniformity modification associated with the target image section, or sharpness modification associated with the target image section.

The rendering module 218 accepts a modified target image from the image generation module 216 and fetches the patterns associated with the target image attributes. Based on the patterns associated with the target image attributes, the rendering module 218 may mark a boundary in the modified target image, before providing the modified target image as the output image 206 to the user via a user interface (not shown in FIG. 2). Thus, the output image 206 is the target image that includes modified features of the target image section.

The image processing device 102 thus selectively modifies one or more features of the target image based on attributes identified from user requirements using the NLP technique. Afterwards, the attributes are mapped to the image features and the target image section is identified corresponding to the image features. Further, the image processing device 102 only modifies the target image section rather than modifying the whole target image. Therefore, the image processing device 102 helps in eliminating the problems in the conventional methods and systems related to quality of the image, wastage of resources for training, more time consumption, and loss of data.

Figure 3:
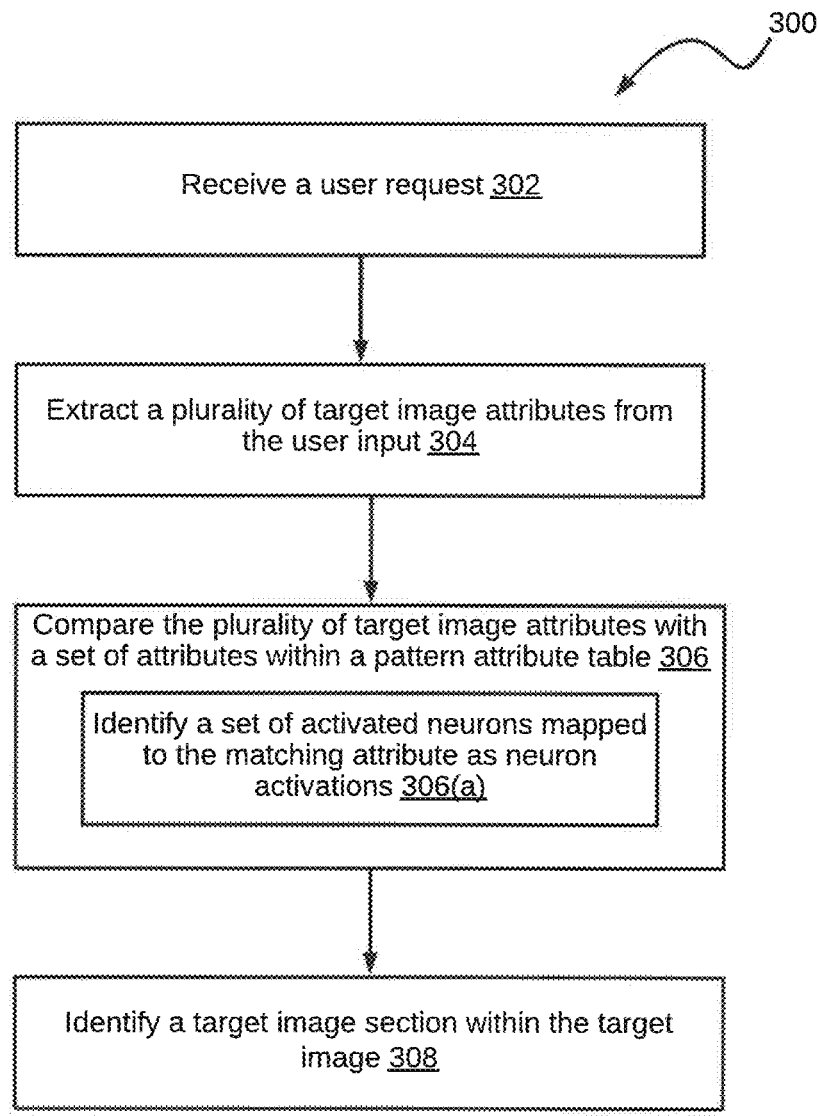
FIG. 3 illustrates a flowchart of a method for identifying a target image section within a target image, in accordance with an embodiment.

Referring now to FIG. 3, a flowchart 300 of a method for identifying a target image section within a target image is illustrated, in accordance with an embodiment. At step 302, the image processing device 102 may receive a user request (for example, the user request 202) from a user. The user request may include a target image and a user input. It should be noted that the user input may include an action corresponding to the target image. It has been already explained in the description above that the user request may belong to a variety of fields.

Thereafter, at step 304, the image processing device 102 extracts a plurality of target image attributes from the user input. The user input may be in the form of an audio input or a text input. The step 304 is further explained in greater detail in conjunction with FIG. 6. At step 306, the image processing device 102 may compare the plurality of target image attributes with a set of attributes within a pattern attribute table. The method of generating the pattern attribute table is explained in detail in conjunction with FIG. 4. An exemplary pattern attribute table is also depicted in FIG. 5. Based on the comparison, a matching attribute may be identified in the pattern attribute table. The pattern attribute table may include mapping of each of the set of attributes to an associated set of activated neurons within a neural network (for example, CNN). In an embodiment, when the target image attributes do not match with any of the set of attributes within the pattern attribute table, the same is informed to the user via the user interface either directly or in a semantic sense.

The step 306 further includes a step 306 (*a*), where the image processing device 102 may identify a set of activated neurons that are mapped to the matching attribute as neuron activations corresponding to the plurality of target image attributes. Thereafter, based on the set of activated neurons identified as the neuron activations, the image processing device 102, at step 308, may identify a target image section within the target image processed through the neural network. It may be noted that the identification of the target image section may be performed based on the set of activated neurons identified as the neuron activations, using a back-propagation technique. It will be apparent to a person skilled in the art that the above method may be performed for multiple target image sections within the target image.

Figure 4:
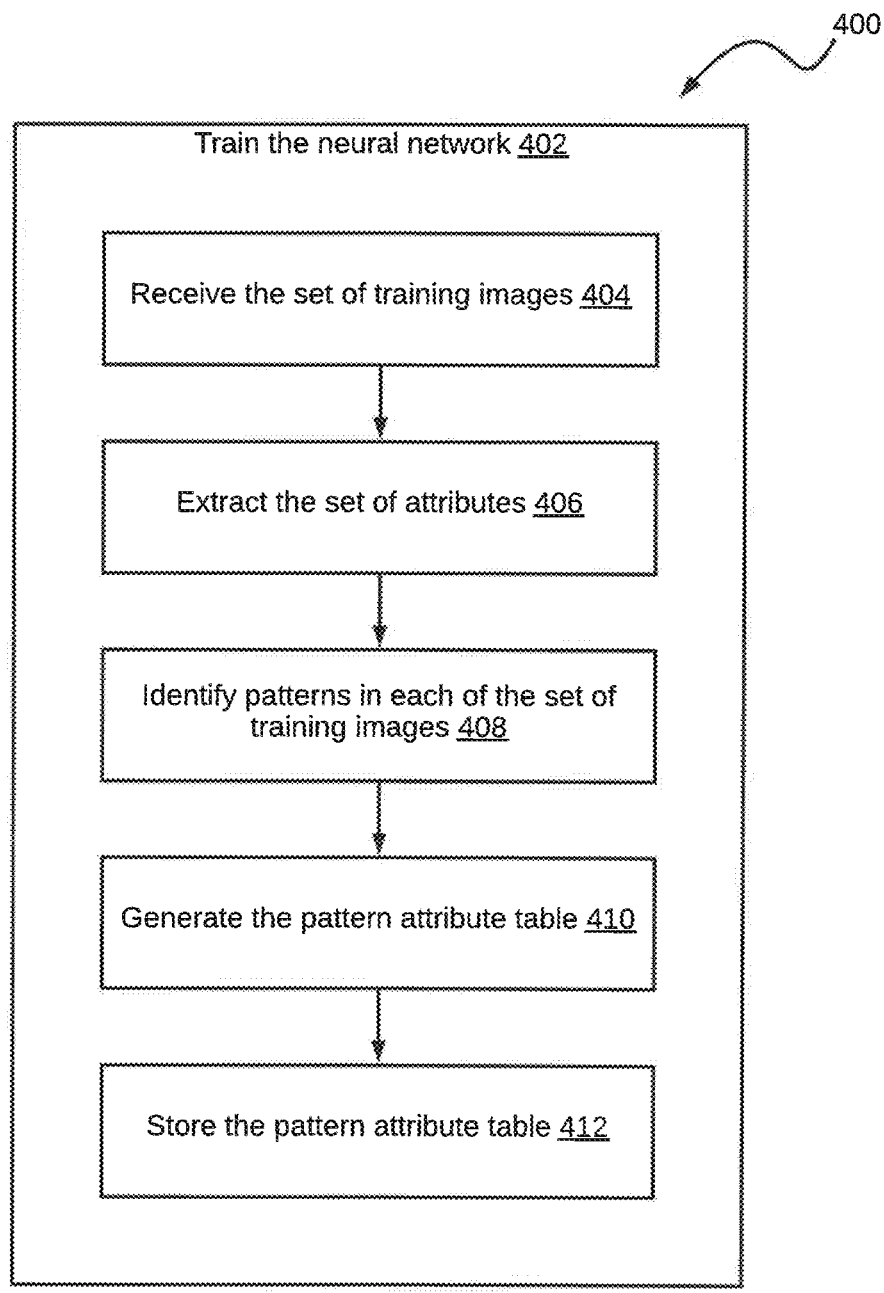
FIG. 4 illustrates a flowchart of a method for training a neural network based on a set of training images to create a pattern attribute table, in accordance with an embodiment.
Figures 5, 6:
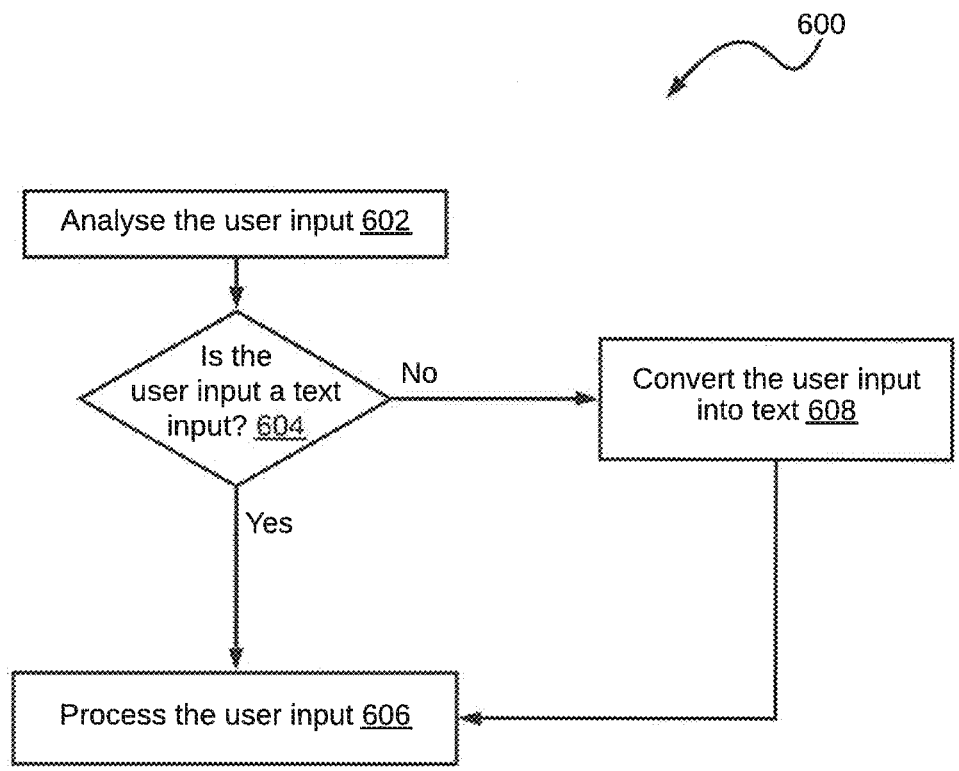
FIG. 5 illustrates a pattern attribute table representing mapping of attributes of training images to corresponding neuron addresses in a neural network, in accordance with an exemplary embodiment
FIG. 6 illustrates a flowchart of a method for extracting target image attributes from a user request, in accordance with an embodiment.

Referring now to FIG. 4, a flowchart 400 of a method for training a neural network based on a set of training images to create a pattern attribute table is illustrated, in accordance with an embodiment. At step 402, the neural network is trained based on a set of training images. The step 402 may further includes steps 404, 406, 408, 410, and 412. At step 404, the set of training images (for example, the training data 202) are received by the neural network. Thereafter, at step 406, a set of attributes is extracted from each of the set of training images. At step 408, patterns are identified in each of the set of training images corresponding to each of the set of attributes. The patterns may be identified based on neuron activations in the neural network.

Thereafter, at step 410, the pattern attribute table is generated corresponding to the set of training images. Herein, the mapping of each of the set of attributes to the associated set of activated neurons indicates corresponding neuron activations in the neural network. An exemplary pattern attribute table that includes image feature, neuron address, and attribute is depicted in conjunction with FIG. 5. Finally, at step 412, the pattern attribute table associated with the set of training images is stored in the data repository 210.

Referring now to FIG. 5, a pattern attribute table 500 representing mapping of attributes of training images to corresponding neuron addresses in a neural network is illustrated, in accordance with an exemplary embodiment. The pattern attribute table 500 includes three different scenarios. The first scenario is related to blocked arteries in heart. In this scenario, the attribute is "blocked artery" and features are F1.jpg, F3.jpg (the training images that include blocked arteries) as shown in the pattern attribute table 500. When F1.jpg and F3.jpg are processed through the neural network, address of neuron activations at various layers in the neural network for blocked arteries are noted as (1, 2, 4) for F1.jpg and (3, 3, 5) for F3.jpg. It may be noted that the address of neuron activations is represented by (layer number, row, and column). In other words, for F3.jpg, a neuron of third row and fifth column in third layer is activated. Thus, for an image of blocked arteries, addresses of neurons that are activated in the neural network are: (1, 2, 4) and (3, 3, 5).

In an embodiment, the features may be generated by the neural network (for example CNN) or an auto encoder. Further, the neural network may be trained for each attribute at distinct locations for each of the training images. The neuron activations may be analyzed for determining common features, by observing changes in the neuron activations as well as the excitation with the complementing attributes (such as blocked and non-blocked arteries). The training images, for this example may include a set of images with normal artery, blocked artery, or different percentage blockage in artery.

Another scenario in the pattern attribute table 500 relates to pulmonary edema (fluid in lever). In this example, the attribute associated with the features F2.jpg, F4.jpg, and F7.jpg is "pulmonary edema." For F2.jpg, the neuron address corresponding to the neuron activations associated with the attribute "pulmonary edema" is (1, 1, 1), for F4.jpg the neuron address is (4, 2, 2), and F7.jpg the neuron address is (3, 2, 3). Yet another scenario in the pattern attribute table 500 relates to Meningioma (i.e., Brain Tumor). In this scenario, the attribute associated with the features F6.jpg, F8.jpg, is "Meningioma," and the neuron addresses for neuron activation are (2, 4, 3) and (5, 4, 1) respectively.

Referring now to FIG. 6, a flowchart 600 of a method for extracting target image attributes from a user request is illustrated, in accordance with an embodiment. At step 602, a user input which is part of the user request is analyzed. The user input includes an action corresponding to a target image. The user input may include at least one of an audio input and a text input as the action to be performed on the target image. At step 604, a check is performed to determine whether the user input is a text input or not. When the user input is textual, then the method proceeds to a step 606, where the user input is processed based on the NLP technique to generate the plurality of target image attributes. Referring back to step 604, when the user input is an audio input and not a textual input, at step 608, the audio input is converted into text input. Thereafter, the control proceeds to the step 606, where the converted text input is processed based on the NLP technique. Thus, the step 608 is performed only when the user input is a voice note.

Figure 7:
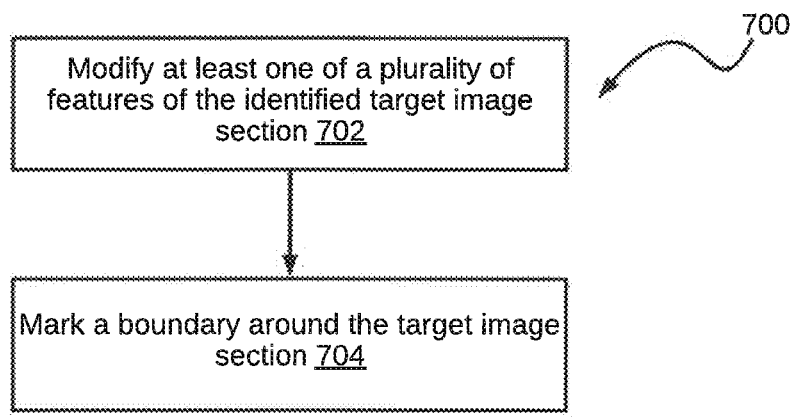
FIG. 7 illustrates a flowchart of a method for modifying features of a target image section identified from a target image, in accordance with an embodiment.

Referring now to FIG. 7, a flowchart 700 of a method for modifying features of a target image section identified from a target image is illustrated, in accordance with an embodiment. At step 702, one or more of a plurality of features of the target image section are modified through the GAN. It should be noted that the plurality of features may include at least one of the resolution of the target image section, the size of the target image section, the color of the target image section, the dimension of the target image section, the contrast of the target image section, noise associated with the target image section, uniformity associated with the target image section, or sharpness associated with the target image section. At step 704, a boundary is marked around the target image section through the GAN.

In an embodiment, the modification may be performed only for the image sections requested by the user. With regards to the modification, attributes of the identified target image section may be fed into the GAN. In other words, the GAN may work as an attribute catcher. The GAN may further includes a generator and a discriminator. The neuron activations associated with attributes of the target image sections are scaled and used as the discriminator output. Thereafter, the generator generates output images until it matches with the activations of the discriminator, i.e., the generator modifies an image until the features are matched.

Figure 8:
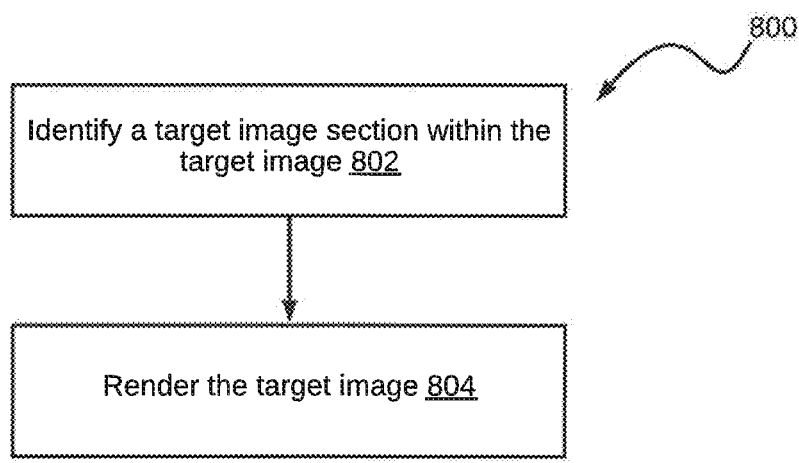
FIG. 8 illustrates a flowchart of a method for rendering a target image including a modified target image section as an output image, in accordance with an embodiment.

Referring now to FIG. 8, a flowchart 800 of a method for rendering a target image including a modified target image section as an output image is illustrated, in accordance with an embodiment. At step 802, a target image section is identified within a target image, which is processed through a neural network. It should be noted that the step 802 may be performed based on the set of activated neurons identified as the neuron activations, using a back-propagation technique. This has already been explained in detail in conjunction with FIG. 3. Thereafter, at step 804, the target image with a boundary around the target image section may be rendered as an output image on a device. The device, for example, may be one of the plurality of input devices 116.

By way of an example, a target image of a crown that includes stones of different colors may be provided by the user to the image processing device 102. The user may additionally provide an audio input for the target image as "enhance the size, resolution, and mark a boundary around red stones." In this case, the image processing device 102 may modify features that may include the resolution, size, and boundary for the red stone. In this example, the sections of the target image where red stone are identified are the target image sections. Finally, the image processing device 102 may provide an output image with enhanced resolution and size of the target image sections as well as a boundary around those sections (i.e., around red stones).

Figure 9:
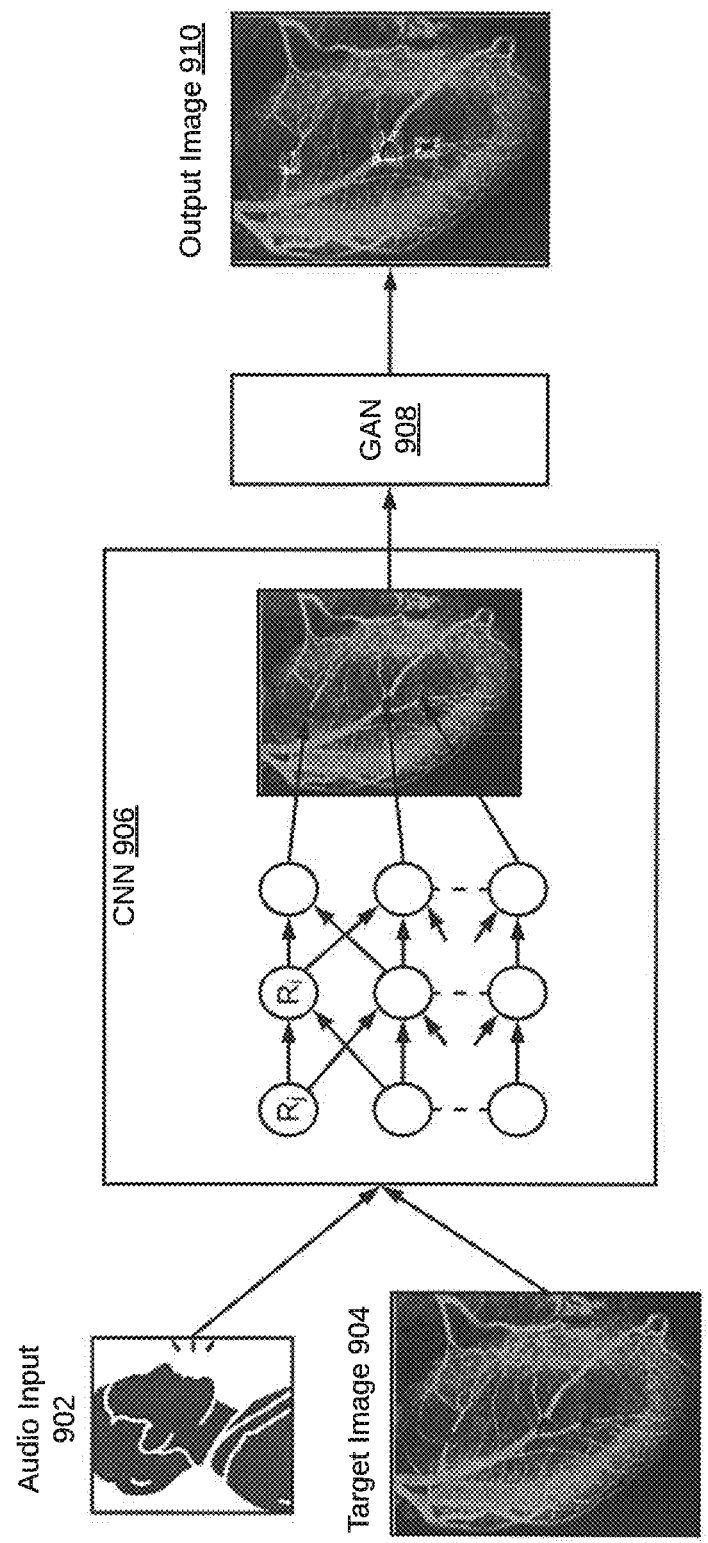
FIG. 9 illustrates identification of target image sections that include blocked arteries in a target image of a heart and subsequent resolution enhancement of the target image sections is illustrated, in accordance with an exemplary embodiment.

Referring now to FIG. 9, identification of target image sections that include blocked arteries in a target image of a heart and subsequent resolution enhancement of the target image sections is illustrated, in accordance with an exemplary embodiment. By way of an example, consider a scenario based on conventional methods and systems, where a cardiologist diagnoses a coronary angiography based on blockages depicted in a CT image. To this end, the cardiologist may have to manually diagnose the coronary angiography and may thus take more time to analyze the blockages based on the CT image. On the other hand, if the cardiologist uses the image processing device 102, it may be considerably easier for him/her to identify or locate the blockages by merely giving an oral command. The oral command, for example, may be "Show me arteries that have blockage above 70% and below 80%." In response, the image processing device 102 may provide an output image to the cardiologist. The output image may include enhanced resolution for image sections that may have arteries with blockage above 70% and below 80%. Additionally, the image processing device 102 may render a boundary around such target image sections in the CT.

This is further illustrated in the exemplary embodiment of FIG. 9. As shown in the FIG. 9, an audio input 902 and a target image 904 may be fed to the CNN 906 within the image processing device 102. The target image 904 is a scan image of a heart that has three blocked arteries. It should be noted that the audio input 902 may include a voice note associated with the target image 904. The audio input 902, for example, may be "enhance the resolution of blocked arteries in the heart." Target image attributes are extracted from the audio input 902 and are matched with a pattern attribute table to identify a matching attribute. Thereafter, address of neurons mapped on to the matching attribute in the pattern attribute table is determined. The address of neurons corresponds to neuron activations for blocked arteries in a heart. This has already been explained in detail in conjunction with FIG. 3, FIG. 4, and FIG. 5. The address of the neurons mapped on to the matching attribute and the target image 904 are processed through the CNN 906.

Based on the address of the neurons, a back-propagation technique may be initiated by the CNN 906. While executing the back-propagation technique, activation of other neurons of the same layer are set to 0, if they do not contribute in the neuron activations. In a previous layer, sum of the normalized activations may be 1 (as it happens for the last layer where the sum of probabilities adds to 1). These pixels proportionally contribute for activations of the indicated neurons. Since, more than one-layer neuron may contribute for the target image attributes, the connection paths of the indicated neurons across multiple layers of the CNN 906 may be considered, i.e., for each neuron of a layer, the projected value of attributes of next layer on to this layer may be considered. The process continues up to an input layer of the CNN 906, where it is projected on to a pixel plane.

As a result of the back-propagation technique, target image sections within the target image 904 that include blocked arteries are identified by the CNN 906. The output of the CNN 906 (i.e., the target image 904 with the identified target image sections) is transmitted to a GAN 908. The GAN 908 modifies one or more features associated with the target image sections that include blocked arteries. The features to be modified may depend upon a requirement of an end user (which may also be determined from the target image attributes). In this example, the end-user may want to enhance resolution of blocked arteries, thus the GAN 908 enhances the identified target image sections and renders an output image 910 to the user.

Figure 10:
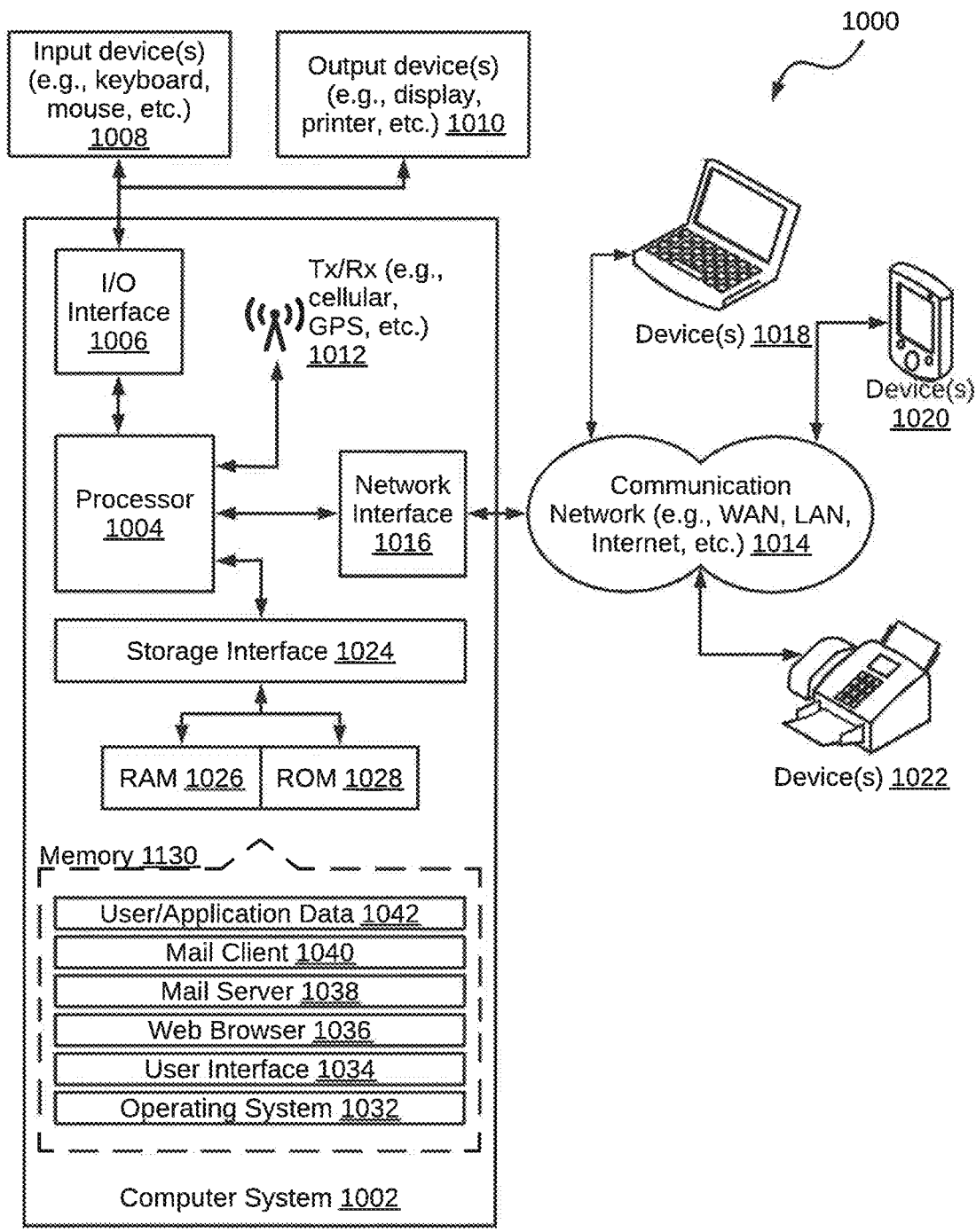
FIG. 10 illustrates a block diagram of an exemplary computer system for implementing embodiments consistent with the present disclosure.

Referring now to FIG. 10, a block diagram of an exemplary computer system 1002 for implementing various embodiments is illustrated. Computer system 1002 may include a central processing unit ("CPU" or "processor") 1004. Processor 1004 may include at least one data processor for executing program components for executing user or system-generated requests. A user may include a person, a person using a device such as such as those included in this disclosure, or such a device itself. Processor 1004 may include specialized processing units such as integrated system (bus) controllers, memory management control units, floating point units, graphics processing units, digital signal processing units, etc. Processor 1004 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 1004 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1004 may be disposed in communication with one or more input/output (I/O) devices via an I/O interface 1006. I/O interface 1006 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 1006, computer system 1002 may communicate with one or more I/O devices. For example, an input device 1008 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 1010 may be a printer, fax machine, video display (for example, cathode ray tube (CRT), liquid crystal display (LCD), light-emitting diode (LED), plasma, or the like), audio speaker, etc. In some embodiments, a transceiver 1012 may be disposed in connection with processor 1004. Transceiver 1012 may facilitate various types of wireless transmission or reception. For example, transceiver 1012 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 1004 may be disposed in communication with a communication network 1014 via a network interface 1016. Network interface 1016 may communicate with communication network 1014. Network interface 1016 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 1014 may include, without limitation, a direct interconnection, local area network (LAN), wide area network (WAN), wireless network (for example, using Wireless Application Protocol), the Internet, etc. Using network interface 1016 and communication network 1014, computer system 1002 may communicate with devices 1018, 1020, and 1022. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 1002 may itself embody one or more of these devices.

In some embodiments, processor 1004 may be disposed in communication with one or more memory devices (for example, RAM 1026, ROM 1028, etc.) via a storage interface 1024. Storage interface 1024 may connect to memory 1030 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 1030 may store a collection of program or database components, including, without limitation, an operating system 1032, user interface application 1034, web browser 1036, mail server 1038, mail client 1040, user/application data 1042 (for example, any data variables or data records discussed in this disclosure), etc. Operating system 1032 may facilitate resource management and operation of computer system 1002. Examples of operating systems 1032 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 1034 may facilitate display, execution, interaction, manipulation, or operation of program components through textual or graphical facilities. For example, user interfaces may provide computer interaction interface elements on a display system operatively connected to computer system 1002, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 1002 may implement a web browser 1036 stored program component. Web browser 1036 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 1002 may implement a mail server 1038 stored program component. Mail server 1038 may be an Internet mail server such as MICROSOFT® EXCHANGE® mail server, or the like. Mail server 1038 may utilize facilities such as ASP, ActiveX, ANSI C++/C #, MICROSOFT .NET® programming language, CGI scripts, JAVA® programming language, JAVASCRIPT® programming language, PERL® programming language, PHP® programming language, PYTHON® programming language, WebObjects, etc. Mail server 1038 may utilize communication protocols such as internet message access protocol (IMAP), messaging application programming interface (MAPI), Microsoft Exchange, post office protocol (POP), simple mail transfer protocol (SMTP), or the like. In some embodiments, computer system 1002 may implement a mail client 1040 stored program component. Mail client 1040 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 1002 may store user/application data 1042, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments disclose method and system for identifying and subsequently modifying image sections within images. The proposed method ensures consistent quality. Thus, irrespective of the whole image, the quality of the identified target image section is maintained. The modification is done selectively according to the user requirement. Thus, unlike conventional systems, the required image sections can be modified. As a result, the proposed method reduces memory requirement, as only specific parts of a target image are enhanced or modified. Reduced memory requirement makes the proposed method feasible for portable devices. Thus, for example, radiologist, clinicians, etc., may use their mobile device to enhance required parts of an image of interest, unlike conventional methods and systems. Moreover, the proposed method reduces the overall processing time required to enhance input images and performs the image enhancement in real time.

The specification has described method and system for identifying and subsequently modifying image sections within images. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for identifying target image sections within images, the method comprising:

receiving, by an image processing device, a user request comprising a target image and a user input, wherein the user input comprises an action corresponding to the target image;

extracting, by the image processing device, a plurality of target image attributes from the user input;

comparing, by the image processing device, the plurality of target image attributes with a set of attributes within a pattern attribute table to identify a matching attribute, wherein the pattern attribute table comprises mapping of each of the set of attributes to an associated set of activated neurons within a neural network, and wherein comparing the plurality of target attributes further comprises:

identifying a set of activated neurons mapped to the matching attribute as neuron activations corresponding to the plurality of target image attributes; and identifying, by the image processing device, a target image section within the target image processed through the neural network, based on the set of activated neurons identified as the neuron activations, using a back-propagation technique.

2. The method of claim 1, further comprising training the neural network based on a set of training images.

3. The method of claim 2, further comprising:
receiving the set of training images;
extracting the set of attributes from each of the set of training images;
identifying patterns in each of the set of training images corresponding to each of the set of attributes, based on neuron activations in the neural network; and
generating the pattern attribute table corresponding to the set of training images, wherein the mapping of each of the set of attributes to the associated set of activated neurons indicates corresponding neuron activations in the neural network.

4. The method of claim 3, further comprising storing the pattern attribute table associated with the set of training images in a data repository.

5. The method of claim 1, wherein extracting the plurality of target image attributes further comprises:
analyzing the user input, wherein the user input comprises at least one of an audio inputs and a text input as the action corresponding to the target image;
processing the user input based on a Natural Language Processing (NLP) technique to generate the plurality of target image attributes.

6. The method of claim 5, further comprising converting the audio input into text before processing based on the NLP technique.

7. The method of claim 1, further comprising modifying at least one of a plurality of features of the identified target image section and generating images based on a Generative adversarial network (GAN).

8. The method of claim 7, wherein the plurality of features comprises at least one of a resolution of the target image section, a size of the target image section, a color of the target image section, a dimension of the target image section, a contrast of the target image section, noise associated with the target image section, uniformity associated with the target image section, or sharpness associated with the target image section.

9. The method of claim 7, wherein modifying the at least one of the plurality of features comprises:
marking a boundary around the target image section; and
rendering the target image with the boundary around the target image section.

10. A system for identifying target image sections within images, the system comprising:
a processor; and
a memory communicatively coupled to the processor, wherein the memory stores processor instructions, which, on execution, causes the processor to:
receive a user request comprising a target image and a user input, such that the user input comprises an action corresponding to the target image;
extract a plurality of target image attributes from the user input;
compare the plurality of target image attributes with a set of attributes within a pattern attribute table to identify a matching attribute, such that the pattern attribute table comprises mapping of each of the set of attributes to an associated set of activated neurons within a neural network, and wherein the memory stores processor instructions, which, on execution, causes the processor to:
identify a set of activated neurons mapped to the matching attribute as neuron activations corresponding to the plurality of target image attributes; and
identify the target image section within the target image processed through the neural network, based on the set of activated neurons identified as the neuron activations, using a back-propagation technique;

11. The system of claim 10, wherein the processor instructions further cause the processor to train the neural network based on a set of training images.

12. The system of claim 11, wherein the processor instructions further cause the processor to:
receive the set of training images;
extract the set of attributes from each of the set of training images;
identify patterns in each of the set of training images corresponding to each of the set of attributes, based on neuron activations in the neural network; and
generate the pattern attribute table corresponding to the set of training images, such that the mapping of each of the set of attributes to the associated set of activated neurons indicates corresponding neuron activations in the neural network.

13. The system of claim 12, wherein the processor instructions further cause the processor to store the pattern attribute table associated with the set of training images in a data repository.

14. The system of claim 10, wherein the processor instructions further cause the processor to:
analyze the user input, such that the user input comprises at least one of an audio inputs and a text input as the action corresponding to the target image;
process the user input based on a Natural Language Processing (NLP) technique to generate the plurality of target image attributes.

15. The system of claim 14, wherein the processor instructions further cause the processor to convert the audio input into text before processing based on the NLP technique.

16. The system of claim 10, wherein the processor instructions further cause the processor to modify at least one of a plurality of features of the identified target image section and generating images based on a Generative adversarial network (GAN).

17. The system of claim 16, wherein the plurality of features comprises at least one of a resolution of the target image section, a size of the target image section, a color of the target image section, a dimension of the target image section, a contrast of the target image section, noise associated with the target image section, uniformity associated with the target image section, or sharpness associated with the target image section.

18. The system of claim 16, wherein the processor instructions further cause the processor to:
mark a boundary around the target image section; and
render the target image with the boundary around the target image section.

19. A non-transitory computer-readable medium for identifying target image sections within images, having stored thereon, a set of computer-executable instructions causing a computer comprising one or more processors to perform steps comprising:
receiving a user request comprising a target image and a user input, wherein the user input comprises an action corresponding to the target image;
extracting a plurality of target image attributes from the user input;
comparing the plurality of target image attributes with a set of attributes within a pattern attribute table to identify a matching attribute, wherein the pattern attribute table comprises mapping of each of the set of attributes to an associated set of activated neurons within a neural network, and wherein comparing the plurality of target attributes further comprises:
- identifying a set of activated neurons mapped to the matching attribute as neuron activations corresponding to the plurality of target image attributes; and identifying a target image section within the target image processed through the neural network, based on the set of activated neurons identified as the neuron activations, using a back-propagation technique.

* * * * *